Jan. 28, 1964     C. E. TACK     3,119,467
TREAD BRAKE ARRANGEMENT
Filed Nov. 2, 1961     2 Sheets-Sheet 1
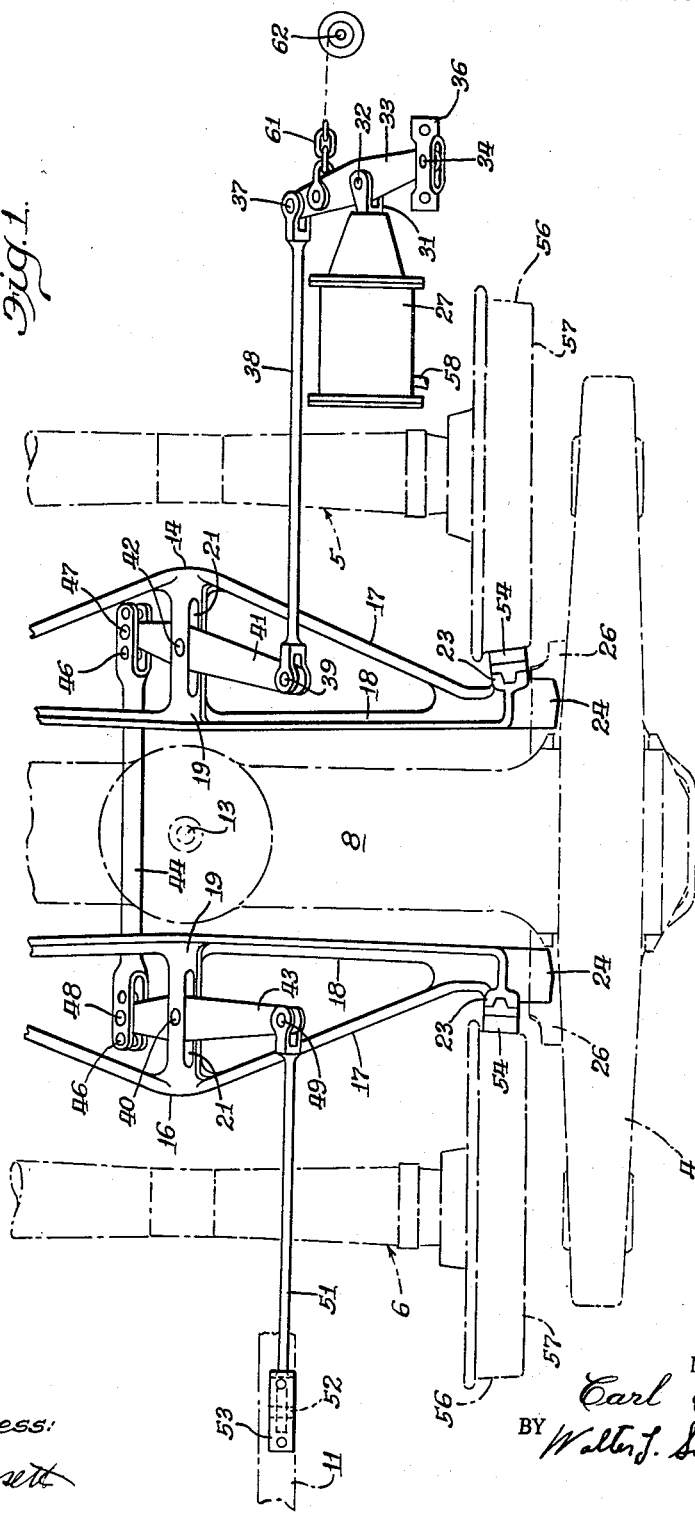
INVENTOR.
Carl E. Tack
BY Walter J. Schlegel, Jr.
Atty.
Witness:
C H Bassett

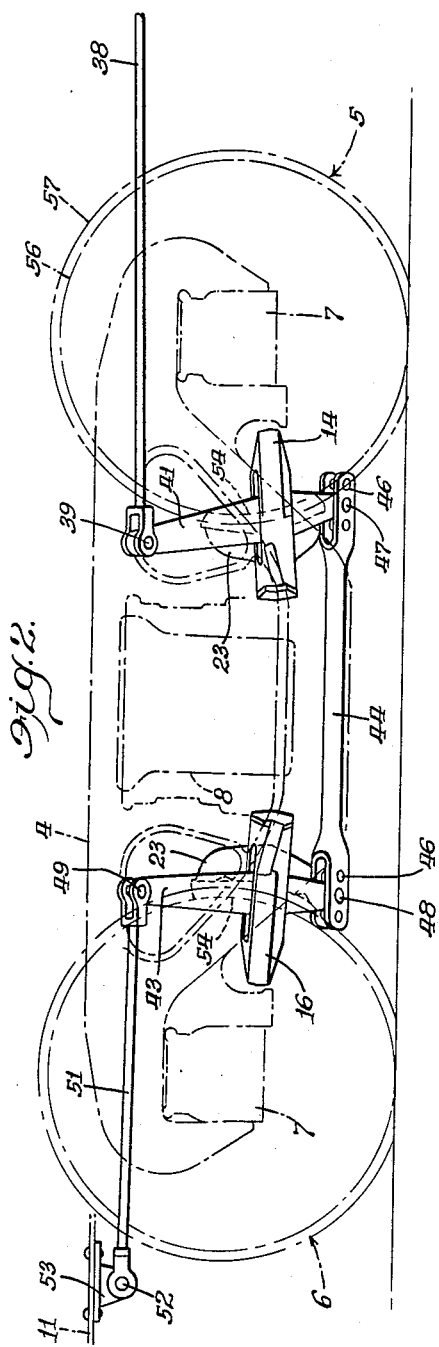
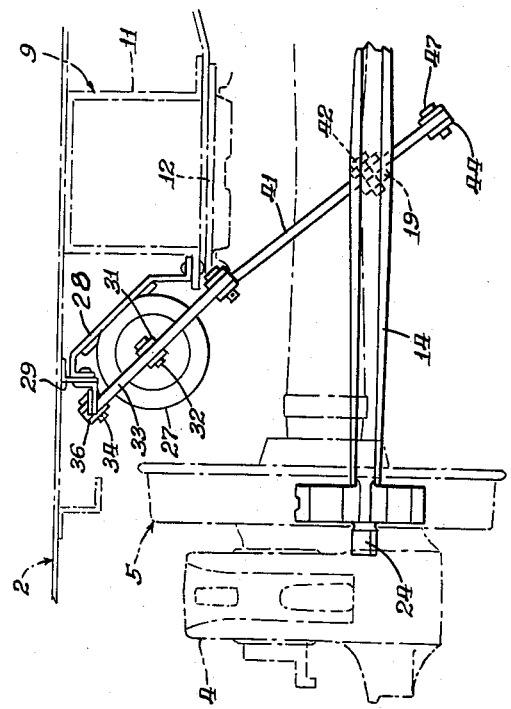

United States Patent Office 3,119,467
Patented Jan. 28, 1964

3,119,467
TREAD BRAKE ARRANGEMENT
Carl E. Tack, Elmhurst, Ill., assignor to Amsted Industries Incorporated, Chicago, Ill., a corporation of New Jersey
Filed Nov. 2, 1961, Ser. No. 149,612
7 Claims. (Cl. 188—52)

This invention relates to brake rigging for railway cars and more particularly to a tread brake arrangement for a four wheel freight car truck of the spring plankless type comprising spaced side frames supported at their ends upon wheel and axle assemblies and interconnected by a bolster.

An object of the invention resides in the provision of a tread brake arrangement embodying two brake beams disposed on opposite sides of the bolster and slidably mounted at their ends on guide members provided on the side frame. Live and dead brake levers are pivotally mounted intermediate their ends on their respective brake beams and have their lower ends interconnected by a connecting rod, the upper end of the dead brake lever being connected by a link to an anchor bracket on the center sill of the car underframe, and the upper end of the live brake lever being connected to a power cylinder mounted on the center sill.

Heretofore, it has been the practice to anchor the upper end of the dead brake lever to the bolster at a point offset from the center thereof. This off-center dead lever connection causes the truck to swivel during application of the brake and results in abnormal wear of the truck parts. By anchoring the dead brake lever to the center sill, the brake force reaction is returned to the underframe.

Another object of the invention resides in the provision of a tread brake arrangement embodying a minimum number of parts to thereby reduce the cost of manufacture, assembly, and replacement of parts.

A further object of the invention resides in the provision of a tread brake arrangement adapted for use with composition brake shoes having a higher coefficient of friction than cast iron brake shoes.

The invention embodies other novel features, details of construction and arrangement of parts which are hereinafter set forth in the specification and claims and illustrated in the accompanying drawings, forming part thereof, wherein:

FIGURE 1 is a top plan view illustrating a tread brake arrangement embodying features of the invention;

FIGURE 2 is a side elevation of the structure shown in FIGURE 1;

FIGURE 3 is an end elevation of the brake arrangement.

Referring now to the drawings for a better understanding of the invention, the tread brake arrangement is shown as applied to a conventional railway freight car having a body 2 supported at each end upon a spring plankless four wheel truck. The truck is shown as comprising parallel side frames 4 supported at their ends upon wheel and axle assemblies 5 and 6 journaled in anti-friction bearings 7, the side frames being interconnected by a bolster 8. The car body is provided with an underframe 9 including a center sill 11 secured to a center plate 12 which is pivotally connected at 13 to the center of the bolster by means of a pivot pin.

The tread brake arrangement is shown as comprising two truss type brake beams 14 and 16 in the form of steel castings, each having tension and compression members 17 and 18 interconnected by a strut 19 formed with a slot 21 and pivot pin apertures. The tension and compression members converge toward the ends of the beam to merge with brake heads 23. Guide lugs 24 extend outwardly from the brake heads 23 for sliding engagement between guide members 26 provided on the side frames 4.

A power cylinder 27 is mounted on a bracket 28 secured at its lower end to the center sill 11 and at its upper end to an underframe beam 29, the cylinder being provided with a piston rod 31 pivotally connected by a pin 32 to an actuating lever 33 intermediate the ends thereof. The upper end of the lever 33 is pivotally connected by a pin 34 to a bracket 36 secured to the underframe beam 29, the lower end of the lever being pivotally connected by a pin 37 to one end of a pull rod 38. The other end of the pull rod 38 is pivotally connected by a pin 39 to the upper end of a live brake lever 41.

The live brake lever 41 is pivotally connected intermediate its ends to the strut 19 of the brake beam 14 by means of a pivot pin 42. A dead brake lever 43 is pivotally connected intermediate its ends to the strut 19 of the brake beam 16 by a pivot pin 40. The lower ends of the brake levers 41 and 43 are interconnected by a connecting rod 44 provided with a series of apertures 46 at each end thereof adapted to receive the pivot pins 47 and 48 to adjust the spacing between the brake beams.

The upper end of the dead brake lever 43 is pivotally connected by a pivot pin 49 to one end of an anchor rod 51 which is pivotally connected at its other end by a pivot pin 52 to a bracket 53 secured to the center sill 11.

Brake shoes 54 are detachably mounted on the brake heads 23 for frictional engagement against the tread surfaces 56 of the wheels 57 during deceleration of the wheel and axle assemblies 5 and 6. The brake shoes 54 are preferably of the composition type having a relatively higher coefficient of friction than cast iron brake shoes, whereby deceleration of the wheel and axle assemblies may be accomplished with less braking force applied to the brake shoes.

In operation, pressurized air from a suitable source is directed through a conduit 58 into the cylinder 27 to move the piston rod 31 in an outward direction and thereby pivot the actuating lever 33 in a clockwise direction about the pivot pin 34. The actuating lever 33 acts through the pull rod 38 to pivot the live brake lever 41 in a counterclockwise direction to move the brake shoes 54 on the brake beam 14 against the tread surfaces 56 of the wheel and axle assembly 5. The live brake lever 41 acts through the rod 44 to pivot the dead brake lever 43 in a counterclockwise direction to move the brake shoes 54 on the brake beam 16 against the tread surfaces 56 of the wheel and axle assembly 6.

For manual operation of the tread brake arrangement thus shown and described, a chain 61 is connected at one end thereof to the lower end of the actuating lever 33 and is conencted at its other end to a conventional manually operable hand brake mechanism 62 mounted on the car body.

I claim:
1. In a railway car having an underframe mounted upon a spring plankless truck having side frames supported at their ends upon wheel and axle assemblies and interconnected by a bolster and means pivotally connecting the underframe to the bolster, a tread brake arrangement comprising two truss type brake beams slidably supported at their ends upon the side frames and disposed between said assemblies, brake shoes on said brake beams engageable with said assemblies, live and dead brake levers pivotally mounted intermediate their ends on the medial portions of their respective brake beams, a connecting rod interconnecting the lower ends of said brake levers, an anchor rod connecting the upper end of the dead brake lever to the car underframe, a pull rod connected to the upper end of said live brake lever, and means including a power cylinder mounted on the car underframe to actuate the pull rod.

2. In a railway car having an underframe mounted upon a spring plankless truck having side frames supported at their ends upon wheel and axle assemblies and interconnected by a bolster and means pivotally connecting the underframe to the bolster, a tread brake arrangement comprising two truss type brake beams slidably supported at their ends upon the side frames and disposed between said assemblies, brake shoes on said brake beams engageable with said assemblies, live and dead brake levers pivotally mounted intermediate their ends on the medial portions of their respective brake beams, a connecting rod interconnecting the lower ends of said brake levers, an anchor rod connecting the upper end of the dead brake lever to the car underframe, a pull rod connected to the upper end of said live brake lever, an actuating lever having one end pivotally connected to the underframe and its other end connected to the pull rod, and means mounted on the car underframe and connected to the actuating lever intermediate the ends thereof to move the actuating lever in a direction to engage the brake shoes against the wheel and axle assemblies.

3. In a railway car having an underframe mounted upon a spring plankless truck having side frames supported at their ends upon wheel and axle assemblies and interconnected by a bolster and means pivotally connecting the underframe to the bolster, a tread brake arrangement comprising two truss type brake beams slidably supported at their ends upon the side frames and disposed between said assemblies, brake shoes on said brake beams engageable with said assemblies, live and dead brake levers pivotally mounted intermediate their ends on the medial portions of their respective brake beams, a connecting rod interconnecting the lower ends of said brake levers, an anchor rod connecting the upper end of the dead brake lever to the car underframe, a pull rod connected to the upper end of said live brake lever, an actuating lever having one end pivotally connected to the underframe and its other end connected to the pull rod, and means including a power device mounted on the car underframe and connected to the actuating lever intermediate the ends thereof to move the actuating lever in a direction to engage the brake shoes against the wheel and axle assemblies.

4. In a railway car having an underframe mounted upon a spring plankless truck having side frames supported at their ends upon wheel and axle assemblies and interconnected by a bolster and means pivotally connecting the underframe to the bolster, a tread brake arrangement comprising two truss type brake beams slidably supported at their ends upon the side frames and disposed between said assemblies, brake shoes on said brake beams engageable with said assemblies, live and dead brake levers pivotally mounted intermediate their ends on the medial portions of their respective brake beams, a connecting rod interconnecting the lower ends of said brake levers, an anchor rod connecting the upper end of the dead brake lever to the car underframe, a pull rod connected to the upper end of said live brake lever, an actuating lever having one end pivotally connected to the underframe and its other end connected to the pull rod, and means including a power device mounted on the car underframe and connected to the actuating lever intermediate the ends thereof to move the actuating lever in a direction to engage the brake shoes against the wheel and axle assemblies, said power device comprising a cylinder secured to the underframe, and a piston rod extending from the cylinder and connected to the actuating lever.

5. A structure according to claim 1 in which said underframe includes a center sill, and said anchor rod and power cylinder are secured to the center sill.

6. A structure according to claim 1 in which said brake beams each comprise tension and compression members having medial portions thereof interconnected by a strut, and said brake levers are pivotally connected to said struts and disposed in a substantially common diagonal plane.

7. A structure according to claim 1 in which said connecting rod is provided with means for varying the spacing between the brake beams.

References Cited in the file of this patent

UNITED STATES PATENTS

| | | |
|---|---|---|
| 1,092,917 | Kiesel | Apr. 14, 1914 |
| 1,179,879 | Waugh | Apr. 18, 1916 |
| 1,735,055 | Priebe | Nov. 12, 1929 |
| 2,375,930 | Leppla | May 15, 1945 |